US008909244B2

(12) United States Patent  (10) Patent No.: US 8,909,244 B2
Curticapean  (45) Date of Patent: Dec. 9, 2014

(54) DISTRIBUTED POSITIONING MECHANISM FOR WIRELESS COMMUNICATION DEVICES

(75) Inventor: Florean Curticapean, Tampere (FI)

(73) Assignee: QUALCOMM Incorporated, San Diego, CA (US)

( * ) Notice: Subject to any disclaimer, the term of this patent is extended or adjusted under 35 U.S.C. 154(b) by 741 days.

(21) Appl. No.: 13/170,353

(22) Filed: Jun. 28, 2011

(65) Prior Publication Data

US 2013/0005347 A1  Jan. 3, 2013

(51) Int. Cl.
*H04W 24/00* (2009.01)
*H04W 64/00* (2009.01)
*G01S 5/02* (2010.01)
*G01S 5/14* (2006.01)

(52) U.S. Cl.
CPC ............ *H04W 64/00* (2013.01); *G01S 5/0226* (2013.01); *G01S 5/14* (2013.01); *Y02B 60/50* (2013.01)
USPC .................. 455/456.1; 455/456.2; 455/456.5; 455/456.6

(58) Field of Classification Search
CPC ............................... H04W 64/00; H04W 4/02
USPC ............................ 455/456.1–456.6
See application file for complete search history.

(56) References Cited

U.S. PATENT DOCUMENTS

| 6,034,635 A | 3/2000 | Gilhousen |
| 6,166,685 A | 12/2000 | Soliman |
| 6,266,014 B1 | 7/2001 | Fattouche et al. |
| 6,420,999 B1 | 7/2002 | Vayanos |
| 6,618,005 B2 | 9/2003 | Hannah et al. |
| 6,744,398 B1 | 6/2004 | Pyner et al. |
| 7,257,412 B2 | 8/2007 | Chen et al. |
| 7,289,813 B2 | 10/2007 | Karaoguz |
| 8,457,655 B2 | 6/2013 | Zhang et al. |
| 8,489,114 B2 | 7/2013 | Zhang et al. |
| 8,509,809 B2 | 8/2013 | Hirsch et al. |
| 8,521,181 B2 | 8/2013 | Zhang et al. |

(Continued)

FOREIGN PATENT DOCUMENTS

| CN | 103858414 | 6/2014 |
| CN | 103947269 | 7/2014 |

(Continued)

OTHER PUBLICATIONS

"PCT Application No. PCT/US12/56017 International Preliminary Report on Patentability", Dec. 20, 2013, 11 pages.

(Continued)

*Primary Examiner* — Wayne Cai
(74) *Attorney, Agent, or Firm* — DeLizio Gilliam, PLLC

(57) ABSTRACT

A wireless communication device can determine its position in accordance with a distributed positioning mechanism to minimize bandwidth and power consumption at the wireless communication device. The wireless communication device can detect positioning control messages exchanged between independent pairs of access points in a wireless communication network. The wireless communication device can determine position information associated with each access point of each of the pairs of access points and timing information associated with the pairs of access points based, at least in part, on the detected positioning control messages. The position of the wireless communication device can then be calculated based, at least in part, on the position information and the timing information associated with the pairs of access points.

20 Claims, 5 Drawing Sheets

(56) References Cited

U.S. PATENT DOCUMENTS

| | | | |
|---|---|---|---|
| 8,755,304 | B2 | 6/2014 | Zhang et al. |
| 8,824,325 | B2 | 9/2014 | Zhang et al. |
| 2001/0053699 | A1 | 12/2001 | McCrady et al. |
| 2002/0155845 | A1 | 10/2002 | Martorana |
| 2002/0196184 | A1 | 12/2002 | Johnson et al. |
| 2003/0134647 | A1 | 7/2003 | Santhoff et al. |
| 2004/0008138 | A1 | 1/2004 | Hockley et al. |
| 2004/0147269 | A1 | 7/2004 | Kim |
| 2004/0258012 | A1 | 12/2004 | Ishii |
| 2004/0264407 | A1 | 12/2004 | Tang et al. |
| 2005/0135257 | A1 | 6/2005 | Stephens et al. |
| 2006/0030350 | A1* | 2/2006 | Mitchell ............... 455/522 |
| 2007/0121560 | A1 | 5/2007 | Edge |
| 2007/0296633 | A1 | 12/2007 | Yanagihara |
| 2008/0103696 | A1 | 5/2008 | Cheok et al. |
| 2008/0125161 | A1 | 5/2008 | Ergen et al. |
| 2008/0130604 | A1 | 6/2008 | Boyd |
| 2008/0188236 | A1 | 8/2008 | Alles et al. |
| 2008/0248741 | A1 | 10/2008 | Alizadeh-Shabdiz |
| 2008/0287139 | A1 | 11/2008 | Carlson et al. |
| 2009/0280825 | A1 | 11/2009 | Malik et al. |
| 2010/0130225 | A1 | 5/2010 | Alles et al. |
| 2010/0135178 | A1 | 6/2010 | Aggarwal et al. |
| 2010/0150117 | A1 | 6/2010 | Aweya et al. |
| 2011/0059752 | A1 | 3/2011 | Garin et al. |
| 2011/0117925 | A1 | 5/2011 | Sampath et al. |
| 2011/0136506 | A1 | 6/2011 | Stewart |
| 2011/0143811 | A1 | 6/2011 | Rodriguez |
| 2011/0188389 | A1 | 8/2011 | Hedley et al. |
| 2011/0244881 | A1 | 10/2011 | Bando et al. |
| 2011/0304506 | A1 | 12/2011 | Choi |
| 2012/0087272 | A1 | 4/2012 | Lemkin et al. |
| 2012/0314587 | A1 | 12/2012 | Curticapean |
| 2012/0315919 | A1 | 12/2012 | Hirsch |
| 2013/0072217 | A1 | 3/2013 | Zhang et al. |
| 2013/0072218 | A1 | 3/2013 | Zhang et al. |
| 2013/0072219 | A1 | 3/2013 | Zhang et al. |
| 2013/0072220 | A1 | 3/2013 | Zhang |
| 2013/0100850 | A1 | 4/2013 | Zhang et al. |
| 2013/0101173 | A1 | 4/2013 | Holeva et al. |
| 2013/0148514 | A1 | 6/2013 | Zhang et al. |
| 2014/0235270 | A1 | 8/2014 | Zhang et al. |

FOREIGN PATENT DOCUMENTS

| | | | |
|---|---|---|---|
| KR | 1020140030274 | | 3/2014 |
| KR | 1020140069196 | | 6/2014 |
| KR | 1020140069203 | | 6/2014 |
| WO | 2012170046 | A1 | 12/2012 |
| WO | 2012170062 | A1 | 12/2012 |
| WO | 2013002812 | A2 | 1/2013 |
| WO | 2013043664 | | 3/2013 |
| WO | 2013043675 | | 3/2013 |
| WO | 2013043681 | | 3/2013 |
| WO | 2013043685 | | 3/2013 |
| WO | 2013059636 | | 4/2013 |
| WO | 2013086393 | A1 | 6/2013 |

OTHER PUBLICATIONS

"PCT Application No. PCT/US2012/056036 International Preliminary Report on Patentability", Dec. 20, 2013, 10 pages.
"PCT Application No. PCT/US2012/056046 International Preliminary Report on Patentability", Dec. 20, 2013, 9 pages.
"PCT Application No. PCT/US2012/056053 International Preliminary Report on Patentability", Dec. 20, 2013, 10 pages.
International Search Report and Written Opinion—PCT/US2011/054977—ISA/EPO—Jan. 31, 2012, 7 pages.
Gholami M.R., et al., "Positioning Algorithms for Cooperative Networks in the Presence of an Unknown Turn-Around Time," 2011 IEEE 12th International Workshop on Signal Processing Advances in Wireless Communications, 2011, pp. 166-170.
U.S. Appl. No. 13/155,037 Office Action, Apr. 3, 2013, 20 pages.
Yu K., et al., "TOA-based distributed localisation with unknown internal delays and clock frequency offsets in wireless sensor networks," IET Signal Processing, 2009, vol. 3 (2), pp. 106-118.
"PCT Application No. PCT/US2012/061081 International Search Report", Mar. 27, 2013, 11 pages.
"PCT Application No. PCT/US2012/068543 International Search Report", Feb. 15, 2013, 15 pages.
PCT Application No. PCT/US2011/043781 International Preliminary Report on Patentability, Jun. 7, 2013, 4 pages.
"PCT Application No. PCT/US2011/046074 International Preliminary Report on Patentability", Jun. 27, 2013, 11 pages.
"PCT Application No. PCT/US2011/054977 International Preliminary Report on Patentability", Jun. 10, 2013, 8 pages.
"U.S. Appl. No. 13/278,642 Office Action", Jul. 19, 2013.
"PCT Application No. PCT/US2012/061081 International Preliminary Report on Patentabililty", Sep. 13, 2013, 6 pages.
"PCT Application No. PCT/US2012/056017 Written Opinion of IPEA", Oct. 1, 2013, 9 pages.
"PCT Application No. PCT/US2012/056036 Written Opinion of IPEA", Oct. 1, 2013, 8 pages.
"PCT Application No. PCT/US2012/056046 Written Opinion of IPEA", Oct. 1, 2013, 7 pages.
"PCT Application No. PCT/US2012/056053 Written Opinion of IPEA", Oct. 1, 2013, 8 pages.
"U.S. Appl. No. 13/315,174 Office Action", Sep. 23, 2013, 23 pages.
"PCT Application No. PCT/US2012/068543 International Preliminary Report on Patentability", Dec. 4, 2013, 7 pages.
U.S. Appl. No. 13/155,037, Curticapean; Florean.
U.S. Appl. No. 13/158,029, Hirsch; Olaf J.
U.S. Appl. No. 13/236,172, Zhang; Xiaoxin et al.
U.S. Appl. No. 13/236,208, Zhang; Xiaoxin et al.
U.S. Appl. No. 13/236,232, Zhang; Xiaoxin et al.
U.S. Appl. No. 13/236,259, Zhang; Xiaoxin et al.
U.S. Appl. No. 13/278,642, Zhang; Xiaoxin et al.
International Search Report and Written Opinion—PCT/US2011/043781—ISA/EPO—Nov. 17, 2011, 7 pages.
International Search Report and Written Opinion—PCT/US2011/046074—ISA/EPO—Dec. 16, 2011, 10 pages.
U.S. Appl. No. 13/236,208 Office Action, Nov. 7, 2012, 14 pages.
U.S. Appl. No. 13/236,172 Office Action, Jan. 3, 2013, 25 pages.
Foy, W.H., "Position-Location Solutions by Taylor-Series Estimation", IEEE Transactions on Aerospace and Electronic Systems, IEEE Service Center, Piscataway, NJ, US, vol. AES-10, No. 2, Mar. 1, 1976, pp. 187-194, XP011166129, ISSN: 0018-9251.
Kleine-Ostmann, T., et al., "A data fusion architecture for enhanced position estimation in wireless networks", IEEE Communications Letters, IEEE Service Center, Piscataway, NJ, US, vol. 5, No. 8, Aug. 1, 2001, pp. 343-345, XP011423565, ISSN: 1089-7798, DOI: 10.1109/4234.940986 Sections II and III.
Li, H., et al., "Combination of Taylor and Chan method in mobile positioning", Cybernetic Intelligent Systems (CIS), 2011 IEEE 10TH International Conference on, IEEE, Sep. 1, 2011, pp. 104-110, XP932136955, DOI : 10.1109/CIS.2011.6169143 ISBN: 978-1-4673-0687-4 Abstract Sections I - III.
Shen, G., et al., "Performance comparison of TOA and TDOA based location estimation algorithms in LOS environment", (WPNC '08) 5th, IEEE, Mar. 27, 2008, pp. 71-78, XP031247832, ISBN: 978-1-4244-1798-8 Section II (TOA Based Location Estimation Algorithms}: "C. Taylor Series Method".
"PCT Application No. PCT/US12/56017 International Search Report", Jan. 3, 2013, 14 pages.
"PCT Application No. PCT/US12/56053 International Search Report", Jan. 3, 2013, 13 pages.
"PCT Application No. PCT/US2012/056036 International Search Report", Jan. 3, 2013, 13 pages.
"PCT Application No. PCT/US2012/056046 International Search Report", Jan. 3, 2013, 13 pages.
Co-pending U.S. Appl. No. 13/315,174, filed Dec. 8, 2011.
"International Search Report and Written Opinion—PCT/054977—ISA/EPO", Jan. 31, 2012, 7 pages.
"U.S. Appl. No. 13/158,029 Office Action", Oct. 3, 2012, 18 pages.
"U.S. Appl. No. 13/236,172 Office Action", Jun. 7, 2012, 25 pages.
"U.S. Appl. No. 13/236,232 Office Action", Oct. 11, 2012, 13 Pages.

(56) References Cited

OTHER PUBLICATIONS

"U.S. Appl. No. 13/315,174 Final Office Action", Mar. 28, 2014, 11 pages.

* cited by examiner

DISTRIBUTED POSITIONING MECHANISM FOR WIRELESS COMMUNICATION DEVICES

BACKGROUND

Embodiments of the inventive subject matter generally relate to the field of wireless communication and, more particularly, to a distributed positioning mechanism for wireless communication devices.

Various positioning techniques can be employed for determining the position of a wireless communication device (e.g., a wireless local area network (WLAN) device) based on receiving wireless communication signals. For example, positioning techniques can be implemented that utilize time of arrival (TOA), round trip time (RTT), or time difference of arrival (TDOA) of wireless communication signals to determine the position of a wireless communication device in a wireless communication network.

SUMMARY

Various embodiments of a distributed positioning mechanism for wireless communication devices are disclosed. In one embodiment, a plurality of positioning control messages exchanged between pairs of access points of a plurality of access points in a wireless communication network are detected. Position information associated with each access point of each of the pairs of access points are determined based, at least in part, on the plurality of positioning control messages. Timing information associated with the pairs of access points are determined based, at least in part, on the plurality of positioning control messages. The position information associated with a communication device of the wireless communication network is calculated based, at least in part, on the position information and the timing information associated with the pairs of access points.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
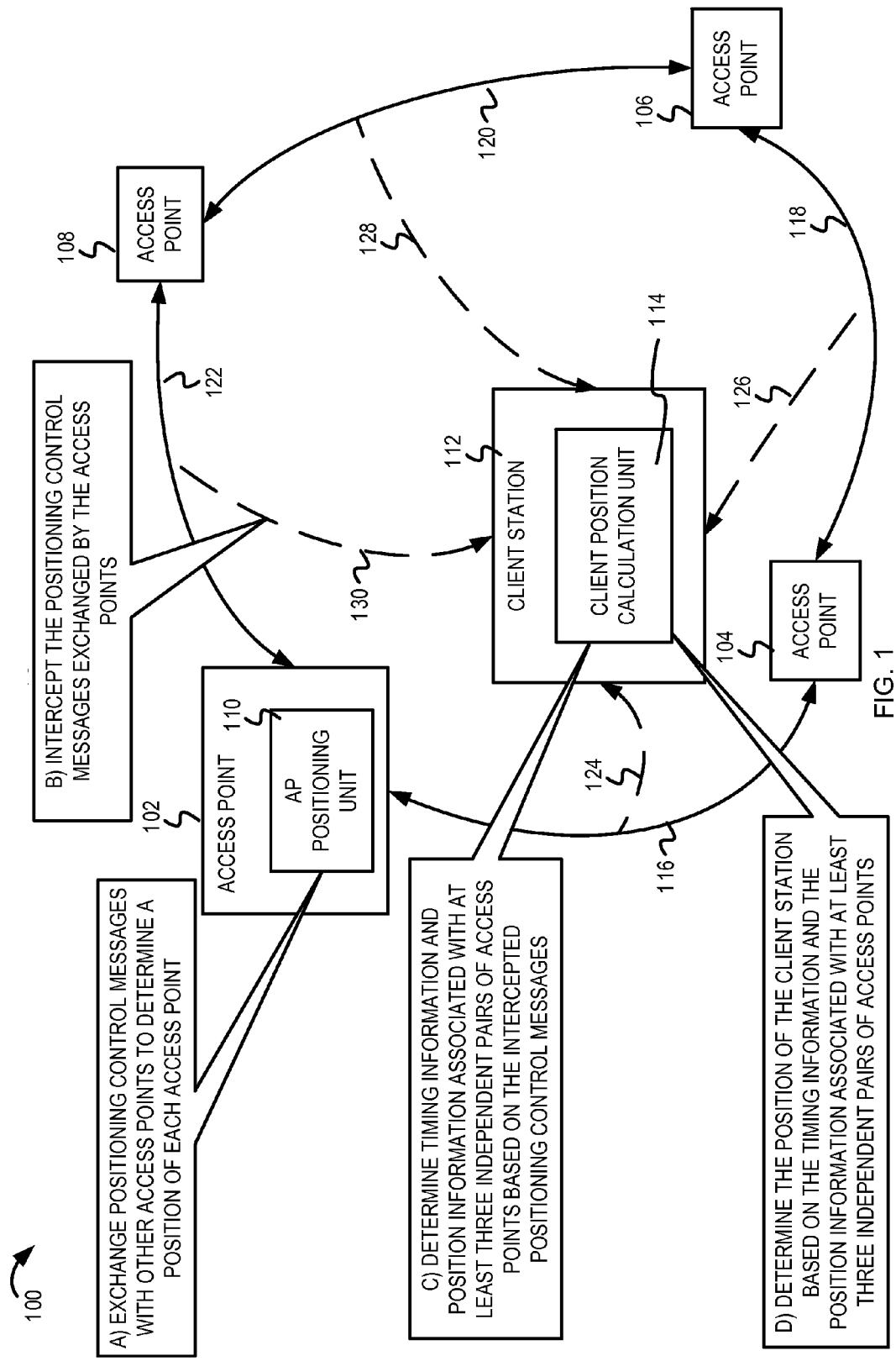
FIG. 1 is an example conceptual diagram illustrating a distributed time difference of arrival (TDOA) mechanism for determining the position of a wireless communication device.

The description that follows includes exemplary systems, methods, techniques, instruction sequences, and computer program products that embody techniques of the present inventive subject matter. However, it is understood that the described embodiments may be practiced without these specific details. For instance, although examples refer to a positioning mechanism for wireless local area network (WLAN) devices, embodiments are not so limited. In other embodiments, the positioning mechanism described herein can be implemented by other wireless standards and devices (e.g., WiMAX devices). In other instances, well-known instruction instances, protocols, structures, and techniques have not been shown in detail in order not to obfuscate the description.

In wireless communication networks, determining the position of an electronic device with wireless communication capabilities (e.g., within an indoor or outdoor environment) can be a desired feature for users of the communication device (e.g., mobile phone users) and operators of the wireless communication network. In some systems, time difference of arrival (TDOA) techniques can be implemented for determining the position of the communication device. For example, the communication device can transmit a request message to multiple access points, receive a response message from the access points, measure the difference between the time instants at which the communication device received the response messages from the access points, and consequently determine the difference between the ranges from each of the access points to the communication device. The position of the communication device can then be determined after at least three such range difference measurements. However, the onus for initiating the TDOA positioning operations (e.g., for transmitting the request message to the access points) typically lies on the communication device. Because the communication device plays an active role in transmitting the request messages to each access point, the communication device may consume a substantial amount of bandwidth and power. Furthermore, the accuracy of the measurements is constrained by the synchronization factor across the clocks associated with each of the access points. In other words, the TDOA positioning technique typically requires the clocks associated with each of the access points to be precisely synchronized, which can be expensive to implement in communication networks.

A position calculation unit of the communication device can be configured to determine the position of the communication device in a distributed manner without necessitating time synchronization across the access points. Each access point in the wireless communication network can transmit positioning request messages to, and receive corresponding positioning response messages from, one or more other access points in the wireless communication network. The positioning request messages and the corresponding positioning response messages together are herein referred to as "positioning control messages." The positioning control messages can comprise an indication of the position of the access point, propagation time intervals associated with transmitting, receiving, and processing the positioning control messages, and/or other information. The position calculation unit of the communication device can passively listen for and detect the positioning control messages exchanged between pairs of the access points. The position calculation unit can determine timing information and position information associated with a predetermined number of pairs of access points. The position calculation unit can then determine the position of the communication device based, at least in part, on the timing information and the position information associated with the predetermined number of pairs of access points.

Such a distributed positioning mechanism for determining the position of the communication device can preclude the need for time synchronization between each of the access points and the wireless communication device. Furthermore, because the wireless communication device can passively listen for (and detect) the positioning control messages, the distributed positioning mechanism can enable any number of wireless communication devices within the range of the access points to compute their position without consuming any bandwidth. This distributed positioning mechanism can also minimize power consumption at the wireless communication device.

FIG. 1 is an example conceptual diagram illustrating a distributed time difference of arrival (TDOA) mechanism for determining the position of a wireless communication device. FIG. 1 depicts a wireless communication network 100 comprising four access points 102, 104, 106, and 108 and a client station 112. The access point (AP) 102 comprises an AP positioning unit 110. Likewise, although not depicted in FIG. 1, each of the access points 104, 106, and 108 also comprise their respective AP positioning units. The client station 112 comprises a client position calculation unit 114. In one implementation, the client station 112 can be any suitable electronic device (e.g., a notebook computer, a tablet computer, a netbook, a mobile phone, a gaming console, a personal digital assistant (PDA), etc.) with wireless communication capabilities.

At stage A, the AP positioning unit 110 of the access point 102 exchanges positioning control messages with the other access points 104, 106, and 108 in the wireless communication network 100 to determine the position of the each of the other access points 104, 106, and 108. In one example, the access points 102, 104, 106, and 108 can be self-locating access points that can determine their own position (e.g., coordinates in three-dimensional or two-dimensional space). In one implementation, the AP positioning unit 110 can scan all the available wireless communication channels to identify other access points 104, 106, and 108 in the wireless communication network 100. For example, the AP positioning unit 110 can identify the access points 104, 106, and 108 based on receiving beacon messages from the access points 104, 106, and 108. The AP positioning unit 110 can then transmit a unicast positioning request message to each of the other access points 104, 106, and 108 within the communication range of the access point 102. The positioning request message can comprise an indication of the position of the access point 102. In response, the AP positioning unit 110 can receive positioning response messages from each of the access points 104, 106, and 108. Each of the positioning response messages can comprise an indication of the position of the corresponding access point 104, 106, and 108, a time difference between receiving the positioning request message and transmitting the positioning response message (referred to herein as "internal propagation time interval"), a sequence number, and/or other information. In the example of FIG. 1, the access point 102 exchanges positioning control messages 116 with the access point 104 and exchanges positioning control messages 122 with the access point 108. The access point 104 exchanges positioning control messages 118 with the access point 106, while the access point 106 exchanges positioning control messages 120 with the access point 108. Although not depicted in FIG. 1, each of the access points 102, 104, 106, and 108 can transmit positioning request messages to some/all of the other access points in the wireless communication network 100 and can receive corresponding positioning response messages. Operations of the access points 102, 104, 106, and 108 exchanging positioning control messages are further described in FIG. 3.

At stage B, the client station 112 intercepts the positioning control messages exchanged by the access points 102, 104, 106, and 108. Dashed lines 124, 126, 128, and 128 represent the client position calculation unit 114 intercepting the positioning control messages 116, 118, 120, and 122 respectively exchanged between pairs of the access points. In one implementation, the client position calculation unit 114 of the client station 112 can scan all available communication channels associated with the client station 112 (and the access points 102, 104, 106, and 108) to detect the positioning control messages. In another implementation, the client position calculation unit 114 can scan a predetermined subset of the available communication channels to detect the positioning control messages. In another implementation, the client position calculation unit 114 may listen for and intercept positioning control messages exchanged via a designated positioning control channel. On detecting the positioning control messages, the client position calculation unit 114 can identify positioning request messages and corresponding positioning response messages exchanged by each pair of access points. In one implementation, each positioning request message and its corresponding positioning response message may comprise a common sequence number. Therefore, in this implementation, the client position calculation unit 114 can identify positioning control messages with the same sequence number and can read an address field within each of the identified positioning control messages to identify the pair of access points that exchanged the positioning control messages. For example, the client position calculation unit 114 may identify a positioning request message with a sequence number "123" and a corresponding positioning response message with the same sequence number "123." Based on reading the address field associated with the positioning request message, the client position calculation unit 114 can identify that the access point 102 transmitted the positioning request message with the sequence number "123." Likewise, the client position calculation unit 114 can identify that the access point 108 transmitted the positioning response message with the sequence number "123." Thus, the client position calculation unit 114 can determine that the access points 102 and 108 form one pair of access points to be analyzed, as will be described below in stage C of FIG. 1 and FIG. 4.

At stage C, the client position calculation unit 114 determines timing information and position information associated with at least three independent pairs of access points based on the detected positioning control messages. The client position calculation unit 114 can analyze the positioning control messages exchanged by each pair of access points (identified at stage B) to determine the timing information associated with the pairs of access points. In one example, as part of the timing information, the client position calculation unit 114 can calculate the difference in arrival time between the positioning request message and the corresponding positioning response message (associated with the same sequence number). As part of the timing information, the client position calculation unit 114 can also determine internal propagation time intervals and external propagation time intervals associated with each of the pairs of access points, as will be further described in FIG. 2. The client position calculation unit 114 can store the timing information determined for each pair of access points in a predetermined memory location, a data structure, or other suitable storage device. In some implementations, the client position calculation unit 114 can determine the timing information associated with each pair of access points based on a single set of exchanged positioning control messages. In other implementations, however, to improve the measurement quality, the client position calculation unit 114 can collect multiple sets of positioning control messages (exchanged by the same pair of access points) and can average the timing information over a predetermined time interval. Additionally, the client position calculation unit 114 can also determine position information associated with each access point from the positioning control messages exchanged by each pair of access points. As described above, in one example, the access points 102, 104, 106, and 108 can transmit an indication of their current position in one or more transmitted positioning control message. The client position calculation unit 114 can read an appropriate data field in the positioning control messages to determine the position of the access points 102, 104, 106, and 108.

At stage D, the client position calculation unit 114 determines the position of the client station 112 based on the timing information and the position information associated with at least three independent pairs of access points. The client position calculation unit 114 can construct three independent positioning equations from the timing information and the access point position information determined for at least three independent pairs of access points, as will be further described in FIG. 2. The client position calculation unit 114 can solve the positioning equations to determine a three-dimensional position of the client station 112. It is noted that, in other implementations, the client position calculation unit 114 can determine the position of the client station 112 based on the timing information and the access point position information associated with any suitable number of independent pairs of access points. For example, the client position calculation unit 114 can construct two independent positioning equations, from the timing information and the access point position information determined for two independent pairs of access points, in order to determine a two-dimensional position of the client station 112.

Figure 2:
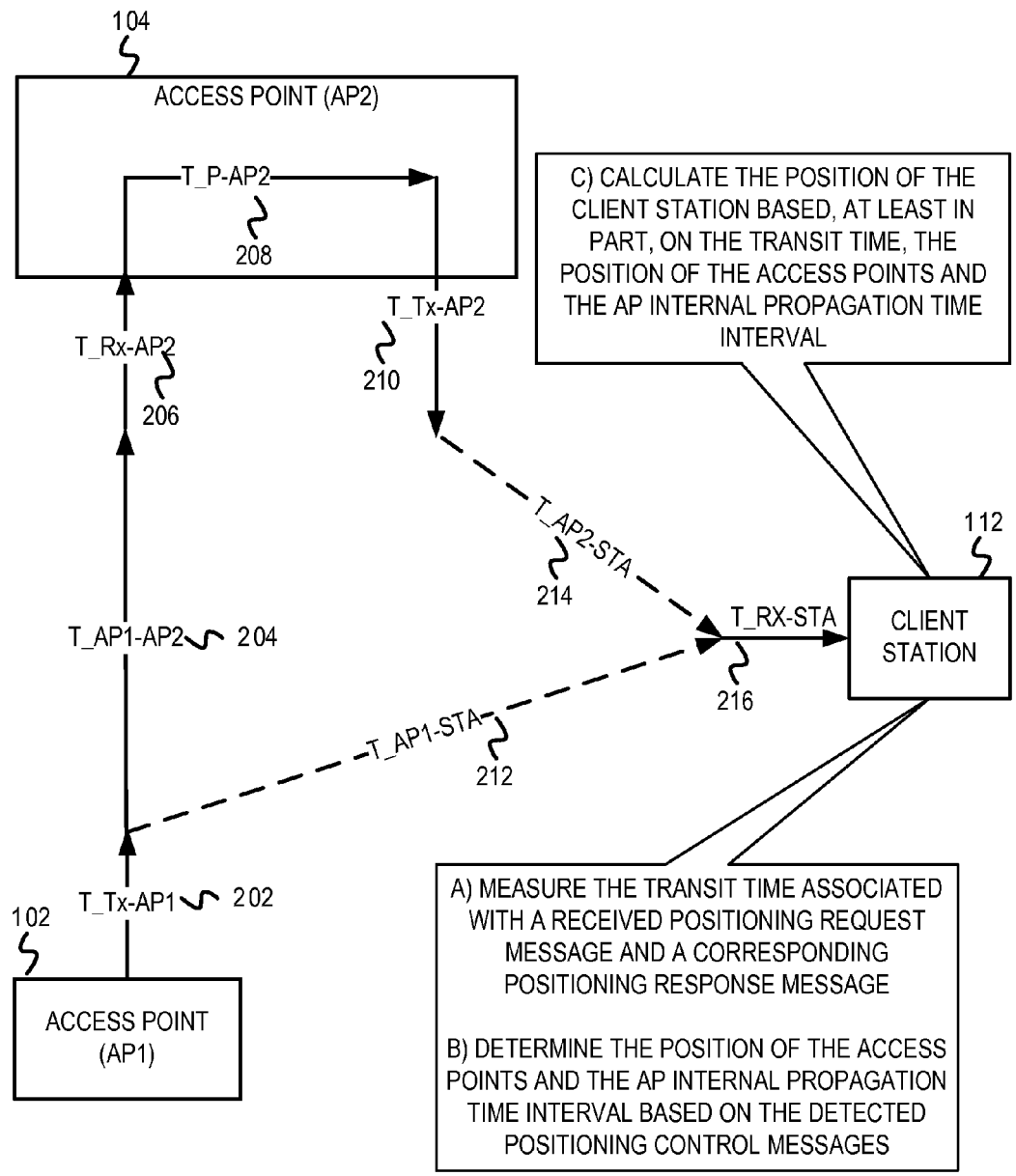
FIG. 2 is an example conceptual diagram illustrating a technique for calculating the position of the client station based on the positioning control messages exchanged by the access points.

FIG. 2 is an example conceptual diagram illustrating a technique for calculating the position of the client station based on the positioning control messages exchanged by the access points. FIG. 2 depicts the client station 112 and the access points 102 and 104. For clarity, the access point 102 is referred to as AP1 and the access point 104 is referred to as AP2. FIG. 2 also depicts the time elapsed during various segments associated with exchanging positioning control messages between the pair of access points 102 and 104, as will be described below.

At stage A, the client position calculation unit 114 of the client station 112 measures the transit time associated with a received positioning request message and a corresponding positioning response message. As described above in FIG. 1, the client position calculation unit 114 can identify positioning control messages associated with the same sequence number to identify the pair of access points 102 and 104. In one example, the positioning request message can comprise an indication of the time instant at which the access point 102 transmitted the positioning request message, and the positioning response message can comprise an indication of the time instant at which the access point 104 transmitted the positioning response message. The client position calculation unit 114 can determine the transit times associated with the positioning control messages based on the time instant at which the positioning control messages were transmitted and based on the time instant at which the client station 112 detected the positioning control messages. In FIG. 2, the time interval $T_{AP1-STA}$ 212 represents the transit time between the transmit antenna associated with the access point 102 and a receive antenna associated with the client station 112. In other words, the time interval 212 can indicate the elapsed time between the instant at which the access point 102 transmitted the positioning request message and the instant at which the client station 112 detected the positioning request message. In addition, the time interval $T_{AP2-STA}$ 214 represents the transit time between the transmit antenna associated with the access point 104 and the receive antenna associated with the client station 112. In other words, the time interval 212 can indicate the elapsed time between the instant at which the access point 104 transmitted the positioning response message and the instant at which the client station 112 detected the positioning response message.

At stage B, the client position calculation unit 114 determines the position of the access points 102 and 104 and the AP internal propagation time interval based on the detected positioning control messages. As described above, the client position calculation unit 114 can read a predetermined data field of the positioning request message to determine the position of the access point 102. Likewise, the client position calculation unit 114 can read a predetermined data field of the positioning response message to determine the position of the access point 104. The AP internal propagation time interval can include a propagation time interval inside a transmitter unit, a propagation time interval inside processing units, and a propagation time interval inside a receiver unit, as described in greater detail below.

In FIG. 2, the time interval $T_{TX-AP1}$ 202 represents the propagation time interval inside the transmitter unit associated with the access point 102. For example, the time interval 202 can represent the elapsed time between the access point 102 generating the positioning request message and the transmit antenna associated with the access point 102 transmitting the positioning request message. The time interval $T_{RX-AP2}$ 206 represents the propagation time interval inside the receiver unit associated with the access point 104. For example, the time interval 206 can represent the elapsed time between the receiver antenna associated with the access point 104 receiving the positioning response message and the processing units associated with the access point 104 receiving the positioning response message from the receiver antenna. The time interval $T_{P-AP2}$208 represents the processing time (or turn-around time) associated with the processing units of the access point 104. The processing time interval 208 can represent the elapsed time for the processing units of the access point 104 to decode the positioning request message, generate the corresponding positioning response message, and provide the positioning response message (e.g., to the transmit antenna) for subsequent transmission. The processing time interval 208 can also comprise inter-frame delay (e.g., short inter-frame space (SIFS)). The time interval $T_{TX-AP2}$ 210 represents the propagation time interval inside the transmitter unit associated with the access point 104. For example, the time interval 210 can represent the elapsed time between the processing units of the access point 104 generating the positioning response message and the transmit antenna associated with the access point 104 transmitting the positioning response message.

The client position calculation unit 114 can also determine the external propagation time interval 204 between the access points 102 and 104. In FIG. 2, the time interval $T_{AP1-AP2}$ 204 represents the external propagation time interval between the transmit antenna associated with the access point 102 and the receive antenna associated with the access point 104. In other words, the time interval 204 can represent the time interval between the instant at which the access point 102 transmitted the positioning request message and the instant at which the access point 104 received the positioning request message. In some implementations, the AP internal propagation time interval and the external propagation time interval 204 can be determined from the positioning control messages. For example, the positioning request message transmitted by the access point 102 can comprise an indication of the propagation time interval 202 inside the transmitter unit associated with the access point 102. The positioning response message transmitted by the access point 104 can comprise an indication of the propagation time intervals 206, 208, and 210 (e.g., the sum of $T_{RX\text{-}AP1}+T_{P\text{-}AP2}+T_{TX\text{-}AP2}$) associated with the access point 104. The access point 104 can also calculate and transmit an indication of the external propagation time interval 204 in the positioning response message. In some implementations, the external propagation time interval 204 may also be calculated by the client station 112 based on the timestamps in the detected positioning request messages and positioning response messages.

Although not depicted in FIG. 2 for clarity, it is noted that the client station 112 can execute the operations described in stages A and B for a predetermined number of independent pairs of access points (e.g., three independent pairs of access points). With reference to FIG. 1, in addition to determining the transit time associated with the positioning control messages exchanged by the access point pair 102 and 104, the client station 112 can determine the transit time associated with the positioning control messages exchanged by other pairs of the access points 102, 104, 106, and 108. The client station 112 can also determine the position, the AP internal propagation time interval, and the external propagation time interval associated with the pairs of access points. After the client position calculation unit 114 determines the transit time, the position, the AP internal propagation time interval, and the external propagation time interval associated with the predetermined number of independent pairs of access points, the client position calculation unit 114 can calculate the position of the client station 112, as described below in stage C.

At stage C, the client position calculation unit 114 calculates the position of the client station 112 based, at least in part, on the transit time, the position of the access points, the AP internal propagation time interval, and the external propagation time interval. The client position calculation unit 114 can also determine (e.g., read from a predetermined memory location) the client internal propagation time interval prior to determining the position of the client station 112. In FIG. 2, the time interval $T_{RX\text{-}STA}$ 216 represents the propagation time interval inside the receiver unit associated with the client station 112. For example, the time interval 216 can represent the elapsed time between the receiver antenna associated with the client station 112 receiving the positioning control messages and the processing units associated with the client station 112 processing the positioning control messages. As depicted in Eq. 1, for each pair of access points 102 and 104, the client position calculation unit 114 can determine a TDOA measurement ($\Delta_{STA}$) based on the positioning control messages exchanged by the pair of access points 102 and 104.

$$\Delta_{STA}=T_{AP2\text{-}AP1}+(T_{RX\text{-}AP1}+T_{P\text{-}AP2}+T_{TX\text{-}AP2})+T_{AP2\text{-}STA}+T_{RX\text{-}STA}-(T_{AP1\text{-}STA}+T_{RX\text{-}STA}) \quad \text{Eq. 1}$$

The client position calculation unit 114 can then construct (for each of the predetermined number of pairs of access points) a positioning equation as depicted in Eq. 2.

$$R_{AP2\text{-}STA}-R_{AP1\text{-}STA}=c^{*}\Delta_{STA}-c^{*}(T_{RX\text{-}AP1}+T_{P\text{-}AP2}+T_{TX\text{-}AP2})-R_{AP1\text{-}AP2} \quad \text{Eq. 2}$$

In Eq. 2, $R_{AP1\text{-}AP2}$ represents the range between the access points 102 and 104. The client position calculation unit 114 can determine the range between the access points 102 and 104 based on the access point position information (e.g., based on 3 dimensional (3-D) position coordinates of the access points 102 and 104). $R_{AP1\text{-}STA}$ and $R_{AP2\text{-}STA}$ represent the range between the access point 102 and the client station 112, and the range between the access point 104 and the client station 112 respectively. Lastly, c is the speed of light. The client position calculation unit 114 can then solve (using any suitable equation solving procedure) the positioning equations determined for the predetermined number of independent pairs of access points to determine the position of the client station 112.

Figure 3:
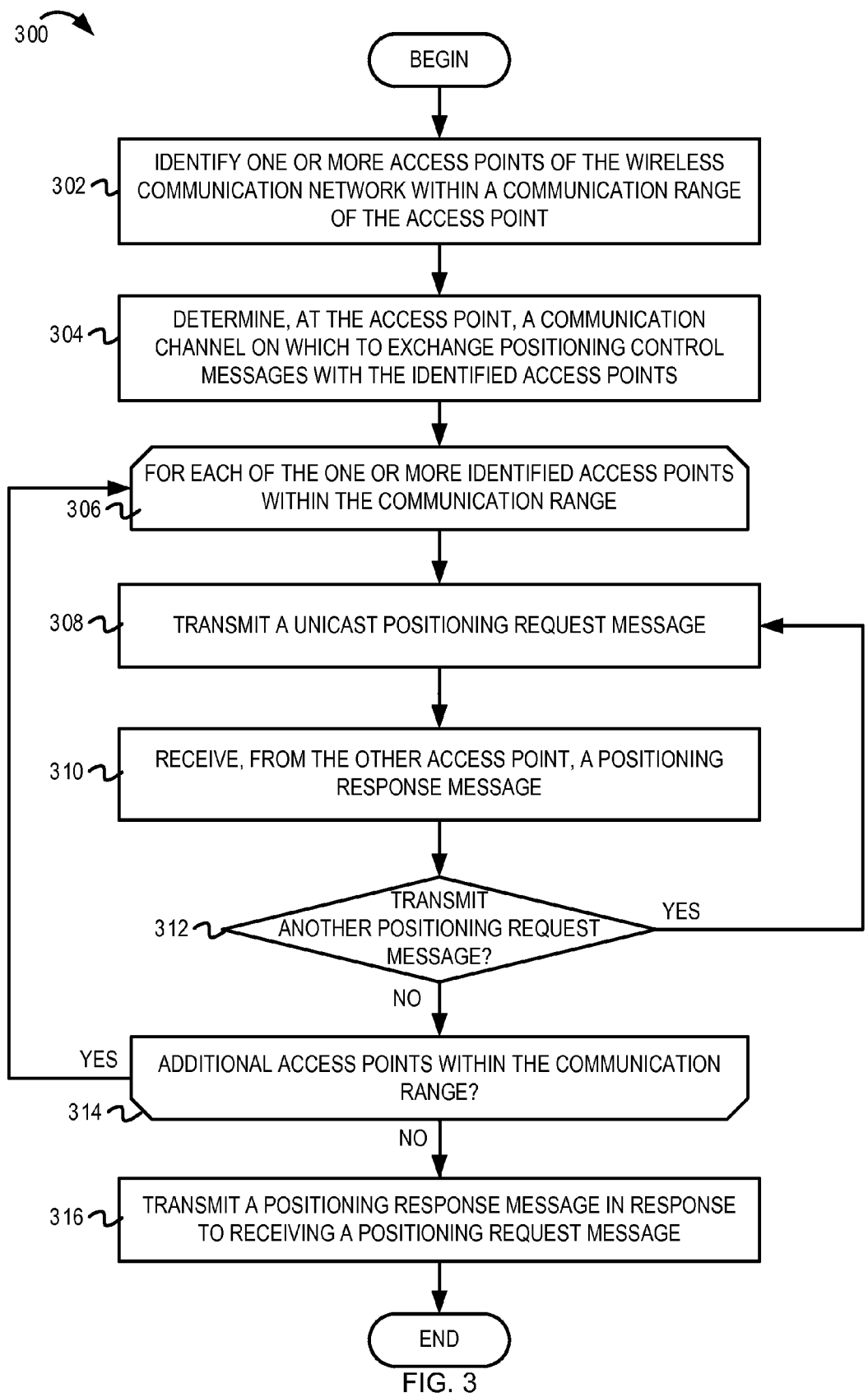
FIG. 3 is a flow diagram illustrating example operations of the access points exchanging positioning control messages.

FIG. 3 is a flow diagram ("flow") 300 illustrating example operations of the access points exchanging positioning control messages. The flow 300 begins at block 302.

At block 302, one or more access points within a communication range are determined. In the example of FIG. 1, the AP positioning unit 110 of the access point 102 can identify the access points 104, 106, and 108 within the communication range of the access point 102. In one implementation, the AP positioning unit 110 can identify the access points 104, 106, and 108 within the communication range based on receiving beacon messages (from the access points 104, 106, and 108) at the access point 102. In another implementation, the AP positioning unit 110 can identify the access points 104, 106, and 108 within the communication range of the access point 102 based on receiving any suitable control messages. The flow continues at block 304.

At block 304, a communication channel on which to exchange positioning control messages with the identified access points is determined. For example, the AP positioning unit 110 can determine the communication channel on which to exchange positioning control messages with the access points 104, 106, and 108. In one implementation, the access points 102, 104, 106, and 108 may be configured to exchange positioning control messages via one previously designated positioning control channel. In another implementation, the access points 102, 104, 106, and 108 may be configured to exchange positioning control messages on all (or a subset) of the available communication channels. In another implementation, the access points 102, 104, 106, and 108 may be configured to switch across multiple communication channels in accordance with a predetermined sequence and/or at predetermined time instants. After the AP positioning unit 110 identifies the communication channel on which to exchange positioning control messages with the other access points 104, 106, and 108, the flow continues at block 306.

At block 306, a loop begins for each of the one or more identified access points within the communication range. For example, the AP positioning unit 110 can initiate a loop to execute operations described below in blocks 308-312 for the access points 104, 106, and 108 within the communication range of the access point 102. The flow continues at block 308.

At block 308, a unicast positioning request message is transmitted to the access point. For example, the AP positioning unit 110 can transmit (or can cause a transceiver unit to transmit) the positioning request message to the access point 104. In one implementation, the positioning request message can comprise an indication of the position (e.g., three-dimensional geospatial coordinates, Cartesian coordinates, etc.) of the access point 102, a sequence number, a timestamp indicating a time instant at which the positioning request message was transmitted, etc. The sequence number can be a randomly (or pseudo-randomly) generated number that can be used (e.g., by the client station 112 as will be described in FIG. 4) to identify corresponding pairs of positioning request and positioning response messages. In some implementations, the AP positioning unit 110 can indicate the position of the access point 102 in each positioning control message transmitted from the access point 102. In another implementation, the AP positioning unit 110 may indicate the position of the access point 102 after a predetermined time interval and/or after transmitting a predetermined number of positioning control packets. For example, if the access point 102 is a fixed access point, the AP positioning unit 110 may indicate the position of the access point 102 every 1 second. As described in the example of FIG. 2, the AP processing unit 110 can determine (e.g., calculate, read from a predetermined memory location, etc.) the propagation time interval 202 inside the transmitter unit associated with the access point 102 and can provide an indication of the propagation time interval 202 in the positioning request message. The flow continues at block 310.

At block 310, a positioning response message is received from the access point. For example, the AP positioning unit 110 can receive the positioning response message from the access point 104, in response to transmitting the positioning request message at block 308. In one example, the positioning response message can comprise an indication of the position (e.g., three-dimensional geospatial coordinates, Cartesian coordinates, etc.) of the access point 104 that transmitted the positioning response message, a sequence number, a timestamp indicating the time instant at which the positioning response message was transmitted, an internal/external propagation time interval, etc. In some implementations, the sequence number transmitted in the positioning response message can be the same as the sequence number transmitted in the positioning request message to identify the corresponding positioning request message. In another implementation, the sequence number transmitted in the positioning response message can be a simple derivation (e.g., an increment by 1) of the sequence number transmitted in the corresponding positioning request message. The positioning response message can comprise an indication of the internal propagation time interval associated with the access point 104. As described in the example of FIG. 2, the positioning response message can comprise an indication of the propagation time interval 206 inside the receiver unit associated with the access point 104, the propagation time interval 208 associated with the processing units of access point 104, and the propagation time interval 210 inside the transmitter unit associated with the access point 104. The positioning response message can also comprise an indication of the external propagation time interval 204 between the access points 102 and 104.

As described above, the access point 104 may transmit an indication of its position in each transmitted positioning control message or may transmit an indication of its position every predetermined time interval. Therefore, the received positioning response message may or may not indicate the position of the access point 104. If the received positioning response message does not indicate the position of the access point 104, the AP positioning unit 110 can determine the position of the access point 104 based on a last received positioning control message from the access point 104 (if available) or can wait to determine the position of the access point 104 from subsequent positioning control messages transmitted by the access point 104. The flow continues at block 312.

At block 312, it is determined whether to transmit another positioning request message. For example, the AP positioning unit 110 can determine whether to transmit another positioning request message to the access point 104. In some implementations, the AP positioning unit 110 can transmit multiple positioning request messages to the same access point 104 (e.g., burst-like procedure). In other implementations, the AP positioning unit 110 may transmit only one positioning request message to the access point 104. If it is determined to transmit another positioning request message to the access point 104, the flow loops back to block 308. Otherwise, the flow continues at block 314.

At block 314, it is determined whether there exist additional access points within the communication range. For example, the AP positioning unit 110 can determine whether there exist additional access points within the communication range of the access point 102. In one implementation, the AP positioning unit 110 may determine whether to transmit the positioning request message to another access point based on the access points 104, 106, and 108 previously identified at block 302. In another implementation, the AP positioning unit 110 may continuously monitor beacon messages (or other suitable messages) received from the access points 104, 106, and 108 to determine which access points are within the communication range of the access point 102 and whether to exchange positioning control messages with any of the identified access points. It is noted that although the flow 300 depicts the AP positioning unit 110 consecutively transmitting the positioning request messages to each access point 104, 106, and 108 within the communication range of the access point 102, embodiments are not so limited. In other embodiments, the AP positioning unit 110 can concurrently transmit the positioning request message to some/all of the access points 104, 106, and 108 within the communication range of the access point 102. If the AP positioning unit 110 determines to exchange positioning control messages with another access point within the communication range of the access point 102, the flow continues at block 306. Otherwise, the flow continues at block 316.

At block 316, a positioning response message is transmitted in response to receiving a positioning request message. For example, the AP positioning unit 110 can transmit a positioning response message in response to receiving a positioning request message from another access point. The positioning response message can comprise the indication of the position of the access point 102, a sequence number associated with the received positioning request message, a timestamp indicating the time instant at which the positioning response message was transmitted, and/or an internal/external propagation time interval, as described above in block 310. Although depicted in FIG. 3, it is noted that the AP positioning unit 110 may not complete transmitting the positioning request messages to all the access points 104, 106, and 108 prior to transmitting the positioning response message. The AP positioning unit 110 can transmit the positioning response message as soon as the positioning request message is received at the access point 102 (or within a predetermined time interval of receiving the positioning request message). From block 316, the flow ends.

Figure 4:
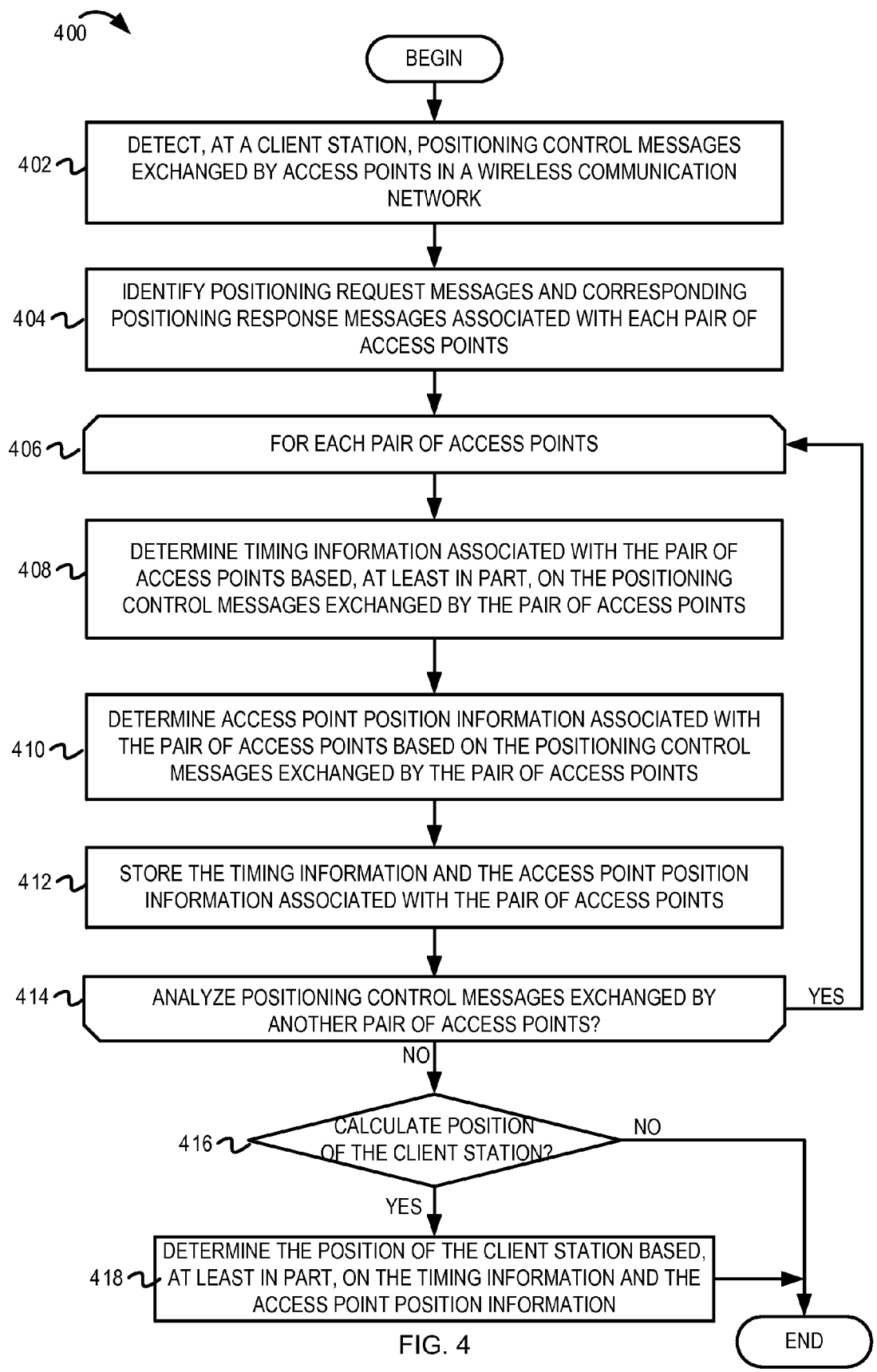
FIG. 4 is a flow diagram illustrating example operations for calculating the position of the client station based on the positioning control messages exchanged by the access points.

FIG. 4 is a flow diagram 400 illustrating example operations for calculating the position of the client station based on the positioning control messages exchanged by the access points. The flow begins at block 402.

At block 402, positioning control messages exchanged by access points in a wireless communication network are detected. As described above in the example of FIG. 1, the client station 112 can detect positioning control messages (i.e., positioning request messages and positioning response messages) exchanged by pairs of access points 102, 104, 106, and 108 in the wireless communication network 100. The client position calculation unit 114 can determine one or more communication channels on which to listen for the positioning control messages based on how the access points 102, 104, 106, and 108 are configured to exchange the positioning control messages (described in block 304 of FIG. 3). In one implementation, the client position calculation unit 114 can listen for positioning control messages on a previously designated positioning control channel. In another implementation, the client position calculation unit 114 can scan all the available communication channels to detect the positioning control messages. In another implementation, the client position calculation unit 114 can scan a predetermined subset of the available communication channels to detect the positioning control messages. In some implementations, the client position calculation unit 114 can switch across communication channels in accordance with a channel switching sequence, at specified time instants, and/or after specified time intervals. In some implementations, the channel switching sequence, the specified time instants, and/or the specified time intervals in accordance with which to switch across communication channels can be predefined and/or configurable. In another implementation, the access points 102, 104, 106, and 108 can indicate the channel switching sequence, the specified time instants, and/or the specified time intervals in accordance with which to switch across communication channels in the positioning control messages. The flow continues at block 404.

At block 404, positioning request messages and corresponding positioning response messages associated with each pair of access points are identified. For example, the client position calculation unit 114 can detect (from the positioning control messages detected at block 402) the positioning request messages and corresponding positioning response messages associated with each pair of access points. In one implementation, as described above, a positioning request message and its corresponding positioning response message may comprise a common sequence number. The client position calculation unit 114 can identify positioning control messages with the same sequence number. The client position calculation unit 114 can then identify the pair of access points that exchanged the pair of positioning control messages with the same sequence number (e.g., based on reading an address field). For example, with reference to FIG. 1, the client position calculation unit 114 can determine that positioning control messages were exchanged between four pairs of access points 102 and 104, 102 and 108, 106 and 104, and 106 and 108. The flow continues at block 406.

At block 406, a loop begins for each pair of access points. For example, the client position calculation unit 114 can initiate a loop to analyze the positioning request messages and the corresponding positioning response messages associated with each pair of access points (determined at block 404). The flow continues at block 408.

At block 408, timing information associated with the pair of access points is determined based, at least in part, on the positioning control messages exchanged by the pair of access points. As described above in the example of FIG. 2, the client position calculation unit 114 can determine the internal propagation time interval 202 from the detected positioning request message. The client position calculation unit 114 can determine the internal propagation time intervals 206, 208, and 210 from the detected positioning response message. The client position calculation unit 114 can also determine the external propagation time interval 204 from the detected positioning response message. The client position calculation unit 114 can then determine the transit times 212 and 214 associated with the positioning control messages based on the time instants at which the access points transmitted the positioning control messages and time instants at which the client station 112 detected the positioning control messages. The flow continues at block 410.

At block 410, access point position information associated with the pair of access points is determined based on the positioning control messages exchanged by the pair of access points. For example, the client position calculation unit 114 can determine the position of the access points 102 and 104 based on reading the detected positioning control messages exchanged by the pair of access points. The flow continues at block 412.

At block 412, the timing information and the access point position information associated with the pair of access points is stored. For example, the client position calculation unit 114 can store the timing information and the access point position information at a predetermined memory location, in a data structure, or another data storage device. As described above in FIG. 1-2, the client position calculation unit 114 can use the timing information and the access point position information to calculate the position of the client station 112. In one implementation, the client position calculation unit 114 can temporarily store the access point position information and can discard the stored access point position information after determining the position of the client station 112. In another implementation, the client position calculation unit 114 can store the access point position information until new access point position information (e.g., new values of the position of the access points) is determined. The flow continues at block 414.

At block 414, it is determined whether positioning control messages exchanged by another pair of access points are to be analyzed. For example, the client position calculation unit 114 can determine whether the positioning request messages and the corresponding positioning response messages associated with another pair of access points is to be analyzed. If so, the flow loops back to block 406 where the client position calculation unit 114 determines the timing information and the access point position information based, at least in part, on the positioning control messages exchanged by the next pair of access points. Otherwise, the flow continues at block 416.

At block 416, it is determined whether the position of the client station can be calculated. For example, the client position calculation unit 114 can determine whether the position of the client station 112 can be calculated based on the stored timing information and the access point position information. In determining whether the position of the client station 112 can be calculated, the client position calculation unit 114 can determine whether timing information and access point position information associated with N independent pairs of access points are known. In one example, to calculate a two-dimensional position of the client station 112, the client position calculation unit 114 can determine whether timing information and access point position information associated with two independent pairs of access points are known. In another example, to calculate a three-dimensional position of the client station 112, the client position calculation unit 114 can determine whether timing information and access point position information associated with three independent pairs of access points are known. If the client position calculation unit 114 determines that the position of the client station 112 can be calculated, the flow continues at block 418. In some implementations, as depicted in the example of FIG. 4, if the client position calculation unit 114 determines that the position of the client station 112 cannot be calculated, the flow ends. In other implementations, if the client position calculation unit 114 determines that the position of the client station 112 cannot be calculated, the flow 400 can loop back to block 402 and the client station 112 can wait to detect another set of positioning control messages.

At block 418, the position of the client station is calculated based, at least in part, on the timing information and the access point position information. The flow 400 moves from block 416 to block 418 if the client position calculation unit 114 determines that timing information and access point position information associated with at least N independent pairs of access points was determined. The client position calculation unit 114 can construct N independent positioning equations from the timing information (determined at block 408) and the access point position information (determined at block 410), as described above in FIG. 2. The client position calculation unit 114 can solve the N independent positioning equations using any suitable techniques to determine the position of the client station 112. From block 418, the flow ends.

It should be understood that FIGS. 1-4 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. For example, although FIGS. 2 and 4 describe the client position calculation unit 114 determining the internal propagation time interval associated with the access points 102 and 104 based on values provided in the positioning control messages, embodiments are not so limited. In some implementations, the client position calculation unit 114 can connect to a database and can determine the internal propagation time interval associated with the access points (e.g., based on knowledge of an access point identifier such as a network address). In another implementation, the client position calculation unit 114 can connect to a server and can query the server for the internal propagation time interval associated with the access points. Furthermore, although the FIGS. 2-3 describe the access points 102, 104, 106, and 108 providing an indication of the propagation time intervals and the access point position information in the positioning control messages, embodiments are not so limited. In some implementations, the access points can determine their position (e.g., by calculating their position, by accessing a predetermined memory location, by connecting to a database, by querying a server, etc.) and can provide an indication of the access point position information in any suitable message. For example, the access point 102 can provide an indication of the access point position information (e.g., as part of an information element (IE)) in a beacon message, a positioning control message, or in another separate (periodically transmitted) control message. Likewise, the access points can provide an indication of the propagation time intervals in any suitable message, such as a beacon message, a positioning control message, or in another separate (periodically transmitted) control message.

In some implementations, as part of determining whether there exist additional access points in the wireless communication network at block 314 in FIG. 3, the AP positioning unit 110 can also determine whether to transmit positioning request messages to the additional access points. In one implementation, if the AP positioning unit 110 determines that access points 104, 106, and 108 are within the communication range of the access point 102, the AP positioning unit 110 can determine to transmit positioning request messages to (and receive corresponding positioning response messages from) all of the access points 104, 106, and 108. In another implementation, if the AP positioning unit 110 determines that access points 104, 106, and 108 are within the communication range of the access point 102, the AP positioning unit 110 can determine to transmit positioning request messages to (and receive corresponding positioning response messages from) only a subset of the access points 104, 106, and 108. For example, if the AP positioning unit 110 determines that the access point 102 received a positioning request message from the access point 108, the AP positioning unit 110 may determine not to initiate another communication with the access point 108 and may not transmit the positioning request message to the access point 108. In another implementation, the AP positioning unit 110 can determine to initiate communications with a subset of the access points based on an indication from the client station 112. For example, based on knowledge that the client position calculation unit 114 is programmed to calculate a two-dimensional position of the client station 112, the AP positioning unit 110 can exchange positioning messages with two other access points.

In some implementations, as described above, the position of the client station 112 can be calculated by the client station itself (e.g., by the client position calculation unit 114). In other implementations, however, operations for calculating the position of the client station 112 can be offloaded to a server. The client station 112 can detect the positioning control messages, can determine the transit time associated with the positioning control messages, and can provide this information to the server. The server can determine (e.g., from a local database) the access point position information and the propagation time intervals associated with the access points 102, 104, 106, and 108 and the client station 112. The server can then calculate the position of the client station 112 and can transmit an indication of the position of the client station 112 to the client station 112.

In some implementations, the positioning control messages can also comprise additional information to enable the client station 112 determine when (and/or on which communication channel) the next set of positioning control messages will be exchanged. For example, the positioning control messages can comprise a channel number of the next communication channel on which the positioning control messages will be exchanged, a time interval after (or a time instant at) which the next set of positioning control messages will be exchanged, etc. This can enable the client station 112 to switch to an inactive power mode (e.g., a sleep mode) when the client station 112 does not expect to receive positioning control messages. The client station 112 can switch to the active power mode at the appropriate time instant to listen for and to detect the positioning control messages (e.g., when the client station 112 is prompted to recalculate its position). Furthermore, in some implementations, the payload of the positioning control messages exchanged by the access points can be encrypted in accordance with a predetermined encryption algorithm. The client station 112 can determine the encryption algorithm being employed (e.g., by reading an unencrypted header of the positioning control messages) and can decrypt the payload positioning control messages to determine the timing information and the access point position information.

Although FIGS. 1-4 describe the access points 102, 104, 106, and 108 being self-locating access points (SLAPs) configured to determine their own position, embodiments are not so limited. In other embodiments, one or more of the access points 102, 104, 106, and 108 can be legacy access points that are not configured to calculate their own position. For example, instead of SLAPs exchanging positioning control messages, a SLAP and a legacy AP can exchange the positioning control messages. The SLAP can initiate the exchange of the positioning control messages by transmitting a positioning request message to the legacy AP. The legacy AP can transmit a positioning response message to the SLAP. The SLAP can broadcast the position of the SLAP, the position of the legacy AP, and/or other timing information in the positioning request message or in a separate control message.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
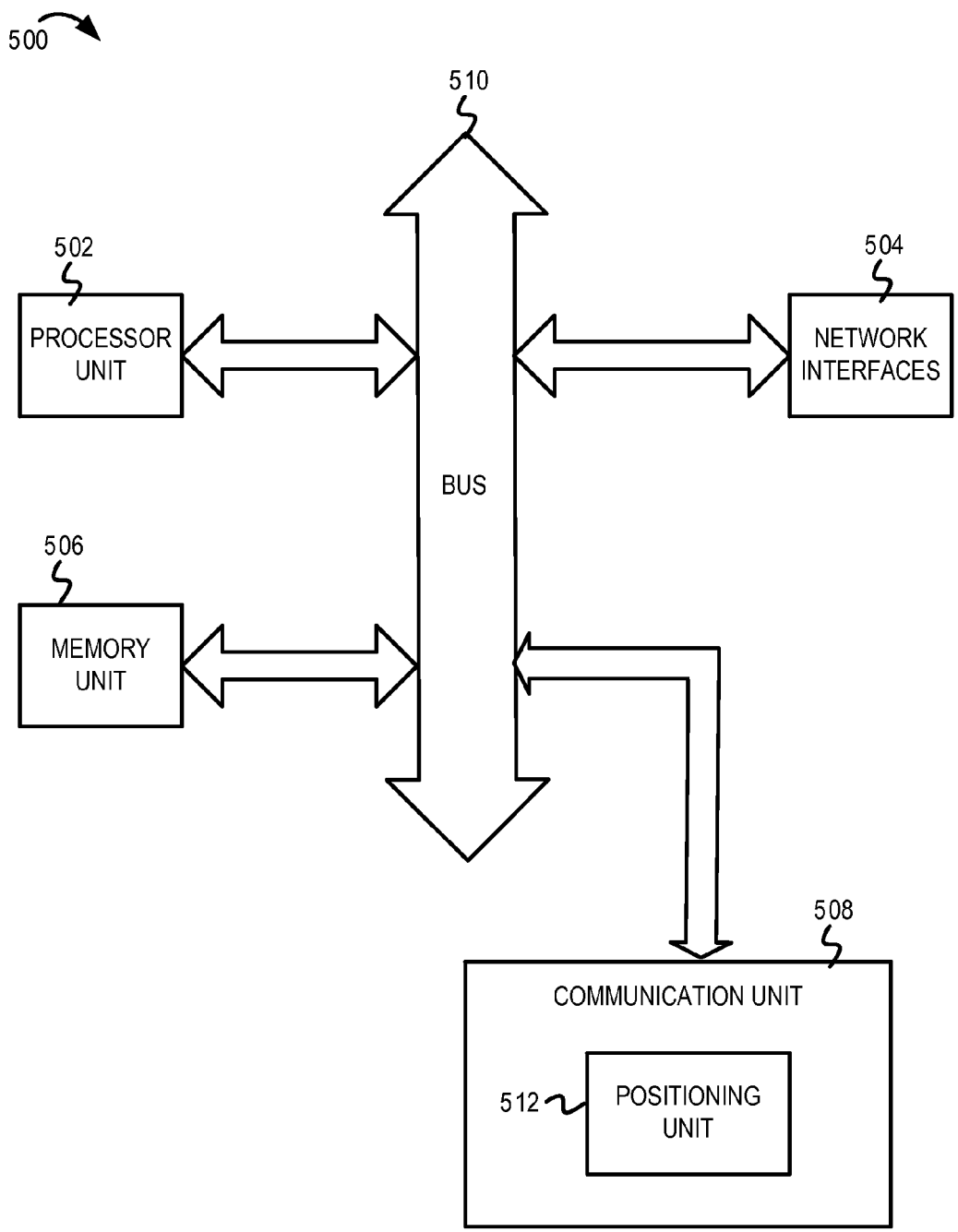
FIG. 5 is a block diagram of one embodiment of an electronic device including a distributed positioning mechanism.

FIG. 5 is a block diagram of one embodiment of an electronic device 500 including a distributed positioning mechanism. In some implementations, the electronic device 500 may be one of a notebook computer, a desktop computer, a tablet computer, a netbook, a mobile phone, a gaming console, a personal digital assistant (PDA), or other electronic systems comprising a WLAN device with wireless communication capabilities. In some implementations, the electronic device 500 can be a standalone WLAN communication device configured to establish a WLAN communication link with one or more WLAN access points. The electronic device 500 includes a processor unit 502 (possibly including multiple processors, multiple cores, multiple nodes, and/or implementing multi-threading, etc.). The electronic device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, InfiniBand®, NuBus, AHB, AXI, etc.), and network interfaces 504 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The electronic device 500 also includes a communication unit 508. The communication unit 508 comprises a positioning unit 512. The communication unit 508 implements functionality to detect positioning control messages exchanged between a predetermined number of pairs of access points and to determine the position of the electronic device 500 based, at least in part, on the detected positioning control messages, as described above with reference to FIGS. 1-4. Any one of these functionalities may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the memory unit 506, and the network interfaces 504 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, techniques for a distributed mechanism for positioning of wireless communication devices as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a communication device in a wireless communication network, the method comprising:
    detecting a plurality of positioning control messages exchanged between at least two pairs of access points in the wireless communication network;
    determining position information associated with each access point of each of the at least two pairs of access points, the position information based, at least in part, on the plurality of positioning control messages;
    determining timing information associated with the at least two pairs of access points based, at least in part, on the plurality of positioning control messages; and determining a current position associated with the communication device of the wireless communication network based, at least in part, on the position information and the timing information.

2. The method of claim 1, wherein said determining the current position associated with the communication device further comprises:
  determining whether the plurality of positioning control messages were exchanged between a predetermined number of independent pairs of access points; and
  determining the current position associated with the communication device in response to determining that the plurality of positioning control messages were exchanged between the predetermined number of independent pairs of access points.

3. The method of claim 1, wherein said determining the current position associated with the communication device further comprises:
  determining whether the position information and the timing information associated with at least a predetermined number of independent pairs of access points are available; and
  determining the current position associated with the communication device in response to determining that the position information and the timing information associated with at least the predetermined number of independent pairs of access points are available.

4. The method of claim 1, wherein determining the position information associated with each access point comprises obtaining a location of each access point from one of the plurality of positioning control messages.

5. The method of claim 1, wherein said determining the timing information associated with the at least two pairs of access points comprises:
  for each pair of access points:
    determining time instants at which a positioning request message and a corresponding positioning response message exchanged by the pair of access points were received at the communication device, wherein the plurality of positioning control messages comprise the positioning request message and the corresponding positioning response message;
    determining time instants at which the positioning request message and the corresponding positioning response message were transmitted by the pair of access points; and
    determining a transit time associated with the pair of access points based on the time instants at which the positioning request message and the corresponding positioning response message were received at the communication device and based on the time instants at which the positioning request message and the corresponding positioning response message were transmitted by the pair of access points.

6. The method of claim 1, wherein said detecting the plurality of positioning control messages exchanged between the at least two pairs of access points comprises one of:
  detecting the plurality of positioning control messages on a predetermined positioning control channel; or
  scanning at least a predetermined subset of a plurality of communication channels associated with the wireless communication network.

7. The method of claim 6, wherein said scanning at least the predetermined subset of the plurality of communication channels comprises at least one member of a group comprising:
  switching from a first of the predetermined subset of the plurality of communication channels to a second of the predetermined subset of the plurality of communication channels in accordance with a channel switching sequence,
  switching from the first of the predetermined subset of the plurality of communication channels to the second of the predetermined subset of the plurality of communication channels after a switching time interval, and
  switching from the first of the predetermined subset of the plurality of communication channels to the second of the predetermined subset of the plurality of communication channels at one or more switching time instants.

8. The method of claim 1, wherein said detecting the plurality of positioning control messages comprises:
  for each pair of access points:
    detecting a positioning request message transmitted from a first access point of the pair of access points; and
    detecting a positioning response message, corresponding to the positioning request message, transmitted from a second access point of the pair of access points.

9. The method of claim 8,
  wherein the positioning request message comprises an indication of a first position of the first access point that transmitted the positioning request message, a sequence number associated with the positioning request message, and a first propagation time interval associated with the first access point, and
  wherein the positioning response message comprises an indication of a second position of the second access point that transmitted the positioning response message, the sequence number associated with the positioning request message, and a second propagation time interval associated with the second access point.

10. The method of claim 9,
  wherein the first propagation time interval comprises a time interval associated with a first transmitter of the first access point; and
  wherein the second propagation time interval comprises a time interval associated with a second transmitter of the second access point, a time interval associated with a receiver of the second access point, a time interval associated with a processor of the second access point, and an external propagation time interval between the first access point transmitting the positioning request message and the receiver of the second access point receiving the positioning request message.

11. The method of claim 1,
  wherein said determining the timing information associated with the at least two pairs of access points comprises, for each pair of access points:
    detecting a first set of positioning control messages exchanged between the pair of access points and a second set of positioning control messages exchanged between the pair of access points;
    determining timing information associated with each of the first set of positioning control messages and the second set of positioning control messages; and
    averaging the timing information associated with each of the first set of positioning control messages and the second set of positioning control messages across a predetermined time interval to yield an average timing information associated with the pair of access points; and
  wherein said determining the current position associated with the communication device comprises:

determining the current position associated with the communication device based, at least in part, on the position information and the average timing information associated with the at least two pairs of access points.

12. A communication device comprising:
a processor;
a network interface in communication with the processor; and
a memory storing instructions, which when executed by the processor, cause the communication device to:
detect a plurality of positioning control messages exchanged between at least two pairs of access points in a wireless communication network;
determine position information associated with each access point of each of the at least two pairs of access points, the position information based, at least in part, on the plurality of positioning control messages;
determine timing information associated with the at least two pairs of access points based, at least in part, on the plurality of positioning control messages; and
determine current position associated with the communication device of the wireless communication network based, at least in part, on the position information and the timing information.

13. The communication device of claim 12, wherein the instructions, which when executed by the processor, cause the communication device to:
determine whether the position information and the timing information associated with at least a predetermined number of independent pairs of access points are available; and
determine the current position associated with the communication device in response to determining that the position information and the timing information associated with at least the predetermined number of independent pairs of access points are available.

14. The communication device of claim 12, wherein the instructions, which when executed by the processor, cause the communication device to:
detect the plurality of positioning control messages on a predetermined positioning control channel; or
scan at least a predetermined subset of a plurality of communication channels associated with the wireless communication network.

15. The communication device of claim 14, wherein the instructions, which when executed by the processor, further cause the communication device to:
switch from a first of the predetermined subset of the plurality of communication channels to a second of the predetermined subset of the plurality of communication channels in accordance with a channel switching sequence,
switch from the first of the predetermined subset of the plurality of communication channels to the second of the predetermined subset of the plurality of communication channels after a switching time interval, or
switch from the first of the predetermined subset of the plurality of communication channels to the second of the predetermined subset of the plurality of communication channels at one or more switching time instants.

16. A non-transitory machine-readable medium having instructions stored therein, which when executed by one or more processors causes the one or more processors to perform operations that comprise:
detecting a plurality of positioning control messages exchanged between at least two pairs of access points in a wireless communication network;
determining position information associated with each access point of each of the at least two pairs of access points based, at least in part, on the plurality of positioning control messages;
determining timing information associated with the at least two pairs of access points based, at least in part, on the plurality of positioning control messages; and
determining a current position associated with a communication device of the wireless communication network based, at least in part, on the position information and the timing information.

17. The non-transitory machine-readable medium of claim 16, wherein determining the current position associated with the communication device further comprises:
determining whether the position information and the timing information associated with at least a predetermined number of independent pairs of access points are available; and
determining the current position associated with the communication device in response to determining that the position information and the timing information associated with at least the predetermined number of independent pairs of access points are available.

18. The non-transitory machine-readable medium of claim 16, wherein determining the timing information associated with the at least two pairs of access points comprises:
for each pair of access points:
determining time instants at which a positioning request message and a corresponding positioning response message exchanged by the pair of access points were received at the communication device, wherein the plurality of positioning control messages comprise the positioning request message and the corresponding positioning response message;
determining time instants at which the positioning request message and the corresponding positioning response message were transmitted by the pair of access points; and
determining a transit time associated with the pair of access points based on the time instants at which the positioning request message and the corresponding positioning response message were received at the communication device and based on the time instants at which the positioning request message and the corresponding positioning response message were transmitted by the pair of access points.

19. The non-transitory machine-readable medium of claim 16, wherein detecting the plurality of positioning control messages comprises one of:
detecting the plurality of positioning control messages on a predetermined positioning control channel; or
scanning at least a predetermined subset of a plurality of communication channels associated with the wireless communication network.

20. The non-transitory machine-readable medium of claim 16, wherein detecting the plurality of positioning control messages exchanged between the at least two pairs of access points comprises:
for each pair of access points:
detecting a positioning request message from a first access point of the pair of access points, wherein the positioning request message comprises an indication of a position of the first access point that transmitted the positioning request message, a sequence number associated with the positioning request message, and a first propagation time interval associated with the first access point; and detecting a positioning response message corresponding to the positioning request message from a second access point of the pair of access points, wherein the positioning response message comprises an indication of a position of the second access point that transmitted the positioning response message, the sequence number associated with the positioning request message, and a second propagation time interval associated with the second access point.

* * * * *